US012266880B2

(12) United States Patent
Ruffini et al.

(10) Patent No.: US 12,266,880 B2
(45) Date of Patent: Apr. 1, 2025

(54) CONTACT INSULATORS FOR USE WITH DIFFERENTIAL PAIRS OF CONTACTS AND METHOD OF TERMINATION

(71) Applicant: TE Connectivity Solutions GmbH, Schaffhausen (CH)

(72) Inventors: Nicholas Paul Ruffini, Lancaster, PA (US); Lynn Robert Sipe, Mifflintown, PA (US); Samantha K Heisey, Palmyra, PA (US); Kyle Gary Annis, Hummelstown, PA (US)

(73) Assignee: TE Connectivity Solutions GmbH (CH)

( * ) Notice: Subject to any disclaimer, the term of this patent is extended or adjusted under 35 U.S.C. 154(b) by 357 days.

(21) Appl. No.: 17/732,643

(22) Filed: Apr. 29, 2022

(65) Prior Publication Data

US 2023/0352868 A1 Nov. 2, 2023

(51) Int. Cl.

| | |
|---|---|
| ***H01R 13/40*** | (2006.01) |
| ***H01B 11/04*** | (2006.01) |
| ***H01R 13/629*** | (2006.01) |
| ***H01R 13/6581*** | (2011.01) |
| ***H01R 24/40*** | (2011.01) |

(52) U.S. Cl.
CPC ............. *H01R 13/40* (2013.01); *H01B 11/04* (2013.01); *H01R 13/629* (2013.01); *H01R 13/6581* (2013.01); *H01R 24/40* (2013.01)

(58) Field of Classification Search
CPC .......... H01B 11/02; H01B 11/04; H01B 11/06
USPC ............................................... 439/733, 733.1
See application file for complete search history.

(56) References Cited

U.S. PATENT DOCUMENTS

| | | | | |
|---|---|---|---|---|
| 9,257,796 | B1 | 2/2016 | Dang | |
| 2012/0034809 | A1* | 2/2012 | Reimchen | H01R 13/622 29/857 |
| 2015/0270647 | A1 | 9/2015 | Hoher et al. | |
| 2017/0365937 | A1 | 12/2017 | Juillet et al. | |

(Continued)

FOREIGN PATENT DOCUMENTS

| | | |
|---|---|---|
| DE | 202015103479 U1 | 8/2015 |
| DE | 202015100245 U1 | 2/2016 |
| DE | 102019016980 B3 | 2/2020 |

OTHER PUBLICATIONS

European Search Report 23170514 Mailed Date Sep. 11, 2023, European App. No. 23170514.6.

*Primary Examiner* — Abdullah A Riyami
*Assistant Examiner* — Amara Anderson

(57) ABSTRACT

A contact insulator for use with high speed cable with differential pairs of contacts. A contact receiving portion has contact receiving slots which open from a first side of the contact insulator. A conductor receiving portion has conductor receiving slots which open from a second side of the contact insulator. A transition portion is positioned between the contact receiving portion and the conductor receiving portion. The transition portion has a contact receiving opening which extends through the contact insulator. The contact receiving opening is dimensioned to allow the contacts to be inserted therethrough. The contact insulator is rotated about the contacts and signal conductors of the high speed cable to position the contacts in the contact receiving slots through the first side of the contact insulator and position the signal conductor in the conductor receiving slots through the second side of the contact insulator.

13 Claims, 4 Drawing Sheets

(56) References Cited

U.S. PATENT DOCUMENTS

| | | | |
|---|---|---|---|
| 2020/0412064 | A1 | 12/2020 | Nguyen |
| 2022/0094108 | A1 | 3/2022 | Watanabe et al. |
| 2023/0352882 | A1 | 11/2023 | Ruffini et al. |
| 2023/0352883 | A1 | 11/2023 | Ruffini et al. |
| 2023/0352884 | A1 | 11/2023 | Ruffini et al. |

* cited by examiner

CONTACT INSULATORS FOR USE WITH DIFFERENTIAL PAIRS OF CONTACTS AND METHOD OF TERMINATION

FIELD OF THE INVENTION

The present invention relates to contact insulators which are used to properly position differential pairs of contacts in a connector assembly. The present invention is also directed to a method of positioning the differential pairs of contacts in the contact insulators.

BACKGROUND OF THE INVENTION

With many high speed connectors, contacts are seated into an insulator housing which is assembled into a metallic shell. The contacts are crimped to signal conductors from cables, such as, Cat6a cables. The contacts need to be seated into the insulator housing for proper location. The insulator housing is generally a single housing with a circular cross section. The contacts are positioned in contact receiving cavities which are positioned about the outer circumference of the insulator housing. With all contacts needing to be held in place in the same insulator housing at the same time, any movements to orient the insulator housing in such a way as to view another side of the insulator housing to facilitate the positioning of additional contacts in the contact receiving cavities can dislodge the contacts that have already been seated. This is particularly true when dealing with contacts that are attached to stiff or twisted conductor, such as Cat6a signal conductors, as the contacts and conductors do not stay in place.

It is therefore desirable to provide a contact insulator which has multiple contact insulator housings to allow for the insertion of less than all of the conductors into each of the housings, thereby preventing the contacts and conductors from dislodging. It would also be desirable to provide a method of inserting the contacts into the housings which securely holds the contacts in position relative to the contact insulator housings.

SUMMARY OF THE INVENTION

An object of the present invention is to provide segmented contact insulators which cooperate with differential pairs of contacts to properly secure the contacts in the contact insulators and to allow for the contacts to be easily inserted into the contact insulators, thereby decreases assembly time and difficulty.

An object of the present invention is to provide a method to insert the contacts in the contact insulators which properly secures the contacts in the contact insulators and decreases assembly time and difficulty.

An object of the present invention is to provide a means for removing the contacts from the contact insulators without damaging the contacts. This allows the contacts to be reorganized as needed for correct signal pair orientation without damaging signal contacts or the contact insulators.

An embodiment is directed to a contact insulator for use with high speed cable with differential pairs of contacts. The contact insulator has a contact receiving portion with a first closed, a second closed side and a third open side. A conductor receiving portion has a first closed side, an oppositely facing second open side. A transition portion is positioned between the contact receiving portion and the conductor receiving portion. Two contact receiving slots are provided in the contact receiving portion, the contact receiving slots extend from a mating end of the contact insulator to the transition portion. Two conductor receiving slots are provided in the conductor receiving portion, the conductor receiving slots extend from a conductor receiving end of the contact insulator to the transition portion. The second open side and the conductor receiving slots of the conductor receiving portion open in an opposite direction as the open third side and the contact receiving slots of the contact receiving portion. The transition portion has a contact receiving opening which extends through the contact insulator from the second open side of the conductor receiving portion to the open third side of the contact receiving portion. The contact receiving opening is dimensioned to allow the contacts to be inserted therethrough.

An embodiment is directed to a contact insulator for use with high speed cable with differential pairs of contacts. The contact insulator includes a contact receiving portion and a conductor receiving portion. The contact receiving portion has contact receiving slots for receiving the contact therein. The contact receiving slots open from a first side of the contact insulator. The conductor receiving portion has conductor receiving slots for receiving the signal conductors therein. The conductor receiving slots open from a second side of the contact insulator. A transition portion is positioned between the contact receiving portion and the conductor receiving portion. The transition portion has a contact receiving opening which extends through the contact insulator. The contact receiving opening is dimensioned to allow the contacts to be inserted therethrough. The contact insulator is rotated about the contacts and the signal conductors to position the contacts in the contact receiving slots through the first side of the contact insulator and position the signal conductor in the conductor receiving slots through the second side of the contact insulator.

An embodiment is directed to a method of terminating a differential pair of contacts to a contact insulator, the contact insulator having a contact receiving portion with contact receiving slots extending from a front of the contact insulator, a conductor receiving portion with conductor receiving slots extending from a rear of the contact insulator, and a transition portion with a contact receiving opening, the contact receiving slots opening in a opposite direction from the conductor receiving slots. The method includes: positioning contacts attached to signal conductors proximate the conductor receiving slots at the rear of the contact insulator; inserting the contact through the contact receiving opening; rotating the contact insulator relative to the contacts and the signal conductor; and positioning the contacts in the contact receiving slots and positioning the signal conductors in the conductor receiving slots.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
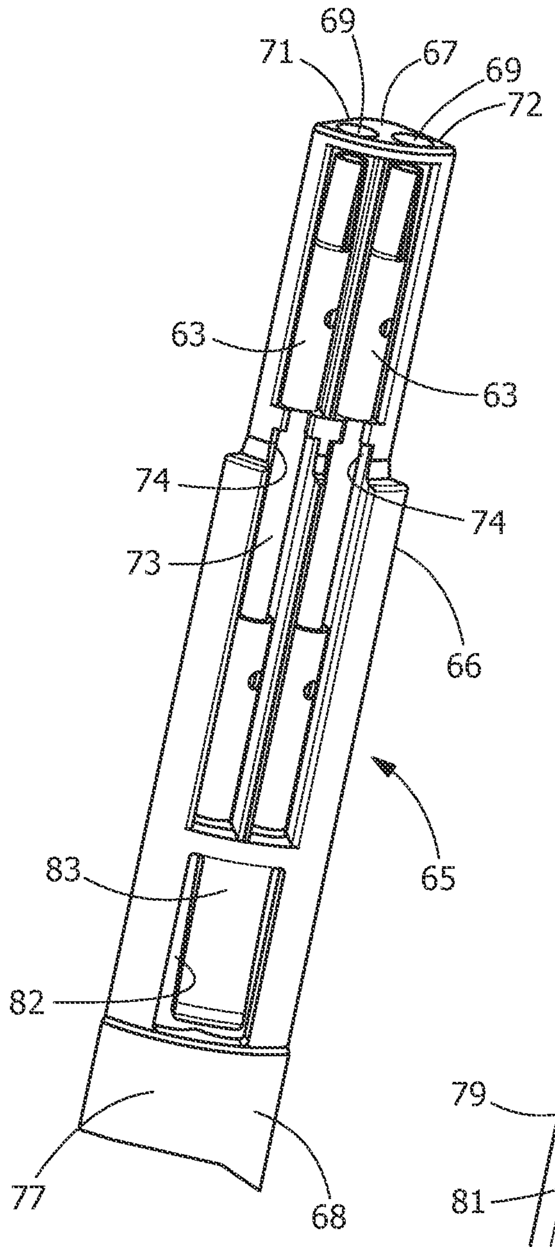
FIG. 1 is a front or top perspective view of an illustrative embodiment of a contact insulator with high speed differential pairs of contacts positioned therein.
Figure 2:
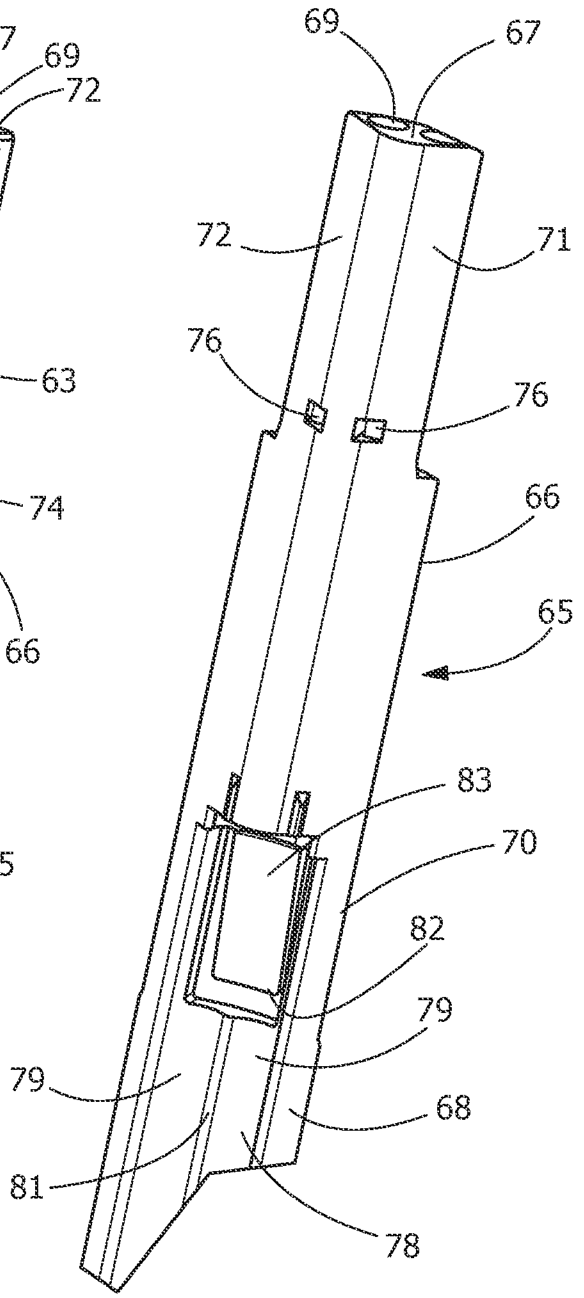
FIG. 2 is a back or bottom perspective view of the contact insulator of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 7:
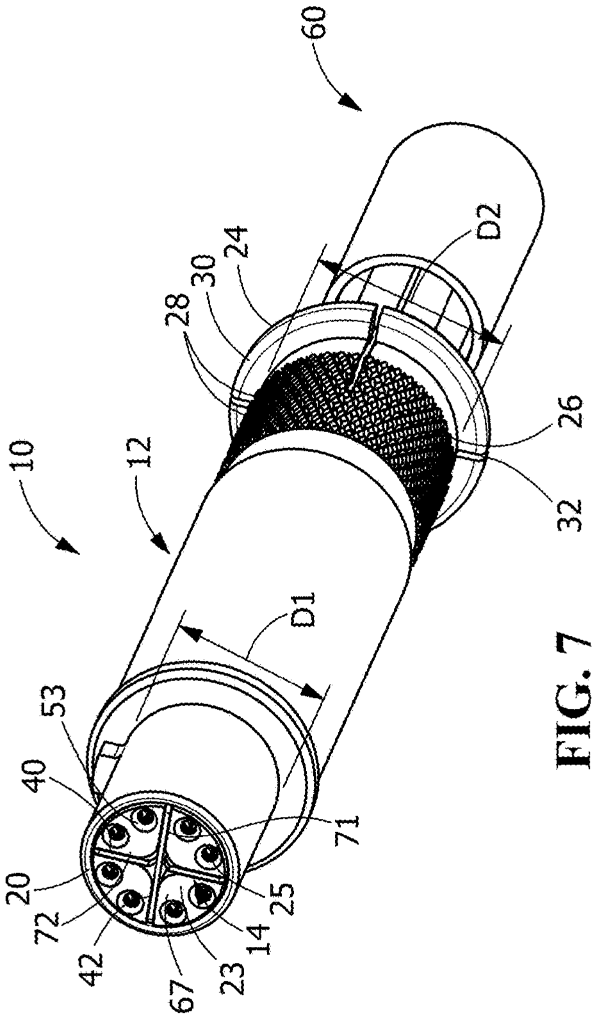
FIG. 7 is a front, side perspective view of an illustrative high speed connector assembly with the contact insulators of FIG. 6 positioned therein.

As shown in FIG. 7, an electrical connector assembly 10 has a shell housing 12 and a crosstalk shield 14. The connector assembly 10 may be a plug connector assembly or a receptacle connector assembly.

The shell housing 12 has a mating end 20 and a conductor receiving end 22. In the illustrative embodiment shown, the shell housing 12 has a mating portion 24 proximate the mating end 20. The mating portion 24 has a smaller outside diameter D1 than the remainder of the shell housing 12. The mating portion 24 has a contact receiving opening 23 with an inner or inside wall 25 which extends circumferentially around the opening 23. However, other configurations of the shell housing 12 may be used.

A recessed portion 26 is provided on the shell housing 12 proximate the conductor receiving end 22. The recessed portion 26 has multiple projections 28 which extend from the surface thereof. The recessed portion 26 has an outer diameter of D2, which is larger than the outside diameter D1 of the mating portion 24. A shoulder 30 extends circumferentially around the conductor receiving end 22 of the shell housing 12. The shoulder 30 is provided at one end of the recess portion 26. However, other configurations of the shell housing 12 may be used.

Crosstalk shield receiving recesses or slots 32 extend from the conductor receiving end 22 toward the mating end 20. The crosstalk shield receiving slots 32 extend through the shoulder 30 and into the recessed portion 26. In the embodiment shown, four crosstalk shield receiving slots 32 are provided to accommodate the configuration of the crosstalk shield 14. However, other numbers of crosstalk shield receiving slots 32 may be used to accommodate different configurations of the crosstalk shield 14.

The crosstalk shield 14 has a first shield member 40 and a second shield member 42. In the illustrative embodiment, the first shield member 40 and the second shield member 42 are made from nickel silver material, however, other materials, including corrosion resistant materials, may be used which exhibit the shielding characteristics required.

The connector assembly 10, including the shell housing 12 and the crosstalk shield 14 are illustrative. Other types and configurations of the connector assembly 10 may be used.

A high speed cable 60 with differential pairs of signal conductors 61 is terminated to the shield housing 12 of the connector assembly 10. The signal conductors 61 have contacts 63 terminated thereto. In the illustrative embodiment shown, four pairs, or eight contacts 63 are shown. Each of the differential pairs of contacts 63 are positioned in respective contact spacers or insulators 65 and the contact spacers or insulators 65 are positioned in the contact receiving cavities 53 defined by the first shield member 40 and the second shield member 42 of the crosstalk shield 14. As each of the contact insulators 65 accommodate only a portion of the total number of contacts 63 and signal conductors 61, the contact insulators 65 are segmented or modular in nature, as more than one contact insulator 65 is needed to fully isolate the contacts 63 and signal conductors 61.

Each contact insulator 65 has a contact receiving portion 66 and a conductor receiving portion 68. A transition portion 70 is positioned between the contact receiving portion 66 and the conductor receiving portion 68.

The contact receiving portion 66 has a generally triangular configuration with a first closed wall or side 71, a second closed wall or side 72 and a third open side 73. When assembled, the first closed side 71 and the second closed side 72 are positioned proximate the first shield member 40 and the second shield member 42. The open third side 73 is positioned proximate the inside wall 25 of the mating portion 24. The open third side 73 is necessitated to allow the contacts 63 to be properly inserted into the contact insulator 65.

In the illustrative embodiment shown, a mating wall 67 extends at a mating end 64 of the contact receiving portion 66. The mating wall 67 extends between the first closed wall or side 71, the second closed wall or side 72 and the third open side 73. Mating contact receiving openings 69 extend through the mating wall 67. In other embodiments, the mating wall 67 may have a different configuration or may not be present.

Figure 3:
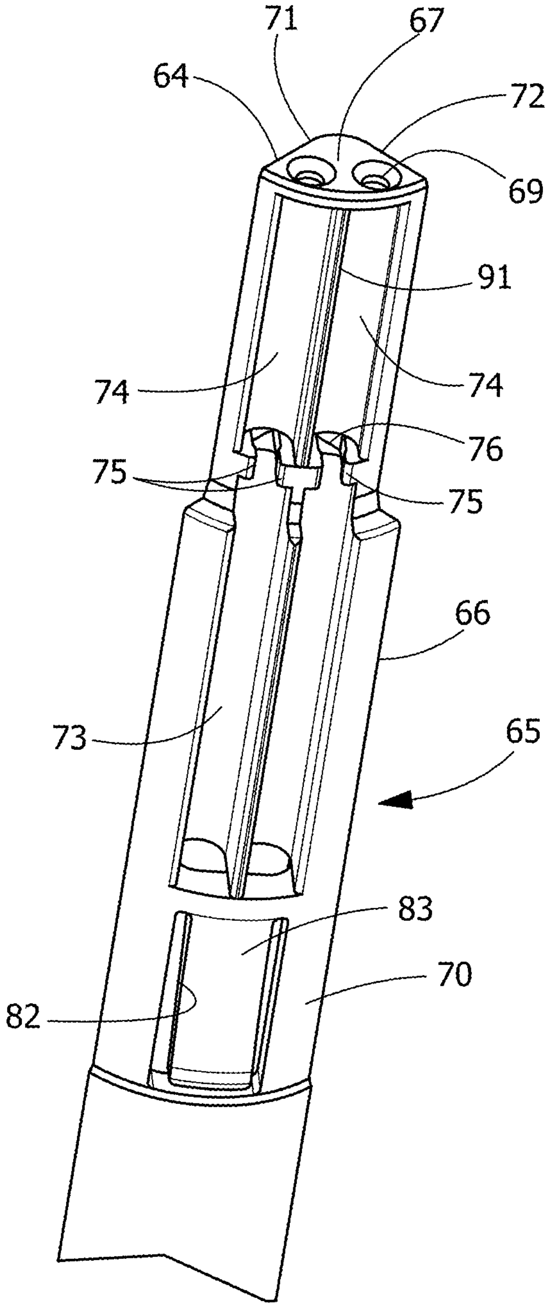
FIG. 3 is a perspective view of the illustrative contact insulator of FIG. 1 with the contacts not shown.

As shown in FIG. 3, two contact receiving slots 74 are provided in the contact receiving portion 66 of each contact insulator 65. The contact receiving slots 74 extend from the mating end 64 of the contact insulator 65 to the transition portion 70. The contact receiving slots 74 open to the first side or front of the contact insulator 65 or the third open side 73. The contact receiving slots 74 are spaced from each other by an insulative wall 91 and extend essentially parallel to each other. Retention projections 75 extend into each of the contact receiving slots 74.

An access opening 76 is provided in each of the contact receiving slots 74 in the contact receiving portion 66. The openings extend through either the first closed side 71 or the second closed side 72 and extend into the contact receiving slots 74. The access openings 76 are in line with the retention projections 75. The access openings 76 are dimensioned to receive a removal tool (not shown) therein to facilitate the removal of the contacts 63 from the contact receiving slots 74 when desired.

The conductor receiving portion 68 has a first closed wall or side 77, an oppositely facing second open side 78. Two conductor receiving slots 79 are provided in the conductor receiving portion 68 of each contact insulator 65. The conductor receiving slots 79 extend from a conductor receiving end 80 of the contact insulator 65 to the transition portion 70. The conductor receiving slots 79 open to the second side or rear of the contact insulator 65 or the second open side 78. The conductor receiving slots 79 are spaced from each other by an insulative wall 81 and extend essentially parallel to each other.

The second open side 78 and the conductor receiving slots 79 of the conductor receiving portion 68 open in an opposite direction as the open third side 73 and the contact receiving slots 74 of the contact receiving portion 66.

The transition portion 70 has a contact receiving cavity or opening 82 which extends through the contact insulator 65 from the second open side 78 of the conductor receiving portion 68 to the open third side 73 of the contact receiving portion 66. The contact receiving opening 82 is dimensioned to allow two contacts 63 to be inserted therethrough.

A retention latch 83 is provided on the transition portion 70. The retention latch 83 extends into the contact receiving opening 82 but does not prevent the insertion of the contact 63 through the contact receiving opening 82.

When assembling the contacts 63 to the contact insulator 65, the contacts 63 are first terminated to the signal conductors 61. The contacts 63 can be terminated to the signal conductors 61 using known methods of termination.

Figure 4:
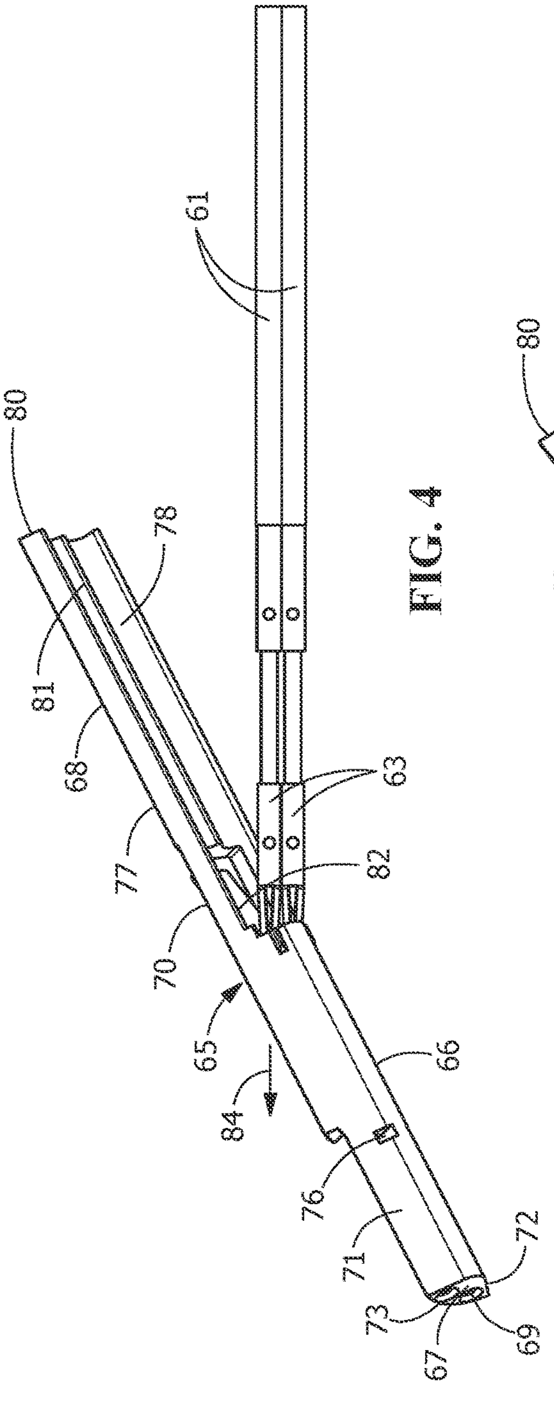
FIG. 4 is a perspective view of contacts and cables being brought into engagement with the illustrative contact insulator of FIG. 1.

With the contacts 63 properly terminated to the signal conductors 61, a pair of contacts 63 are moved into the position proximate the rear of the contact insulator 65 of proximate the second open side 78 of the conductor receiving slots 79 of the conductor receiving portion 68, as shown in FIG. 4. The contacts 63 are then inserted through the contact receiving cavity or opening 82 in the direction of arrow 84. Although the two contacts 63 are shown being inserted at the same time, each contact 63 may be inserted individually.

Figure 5:
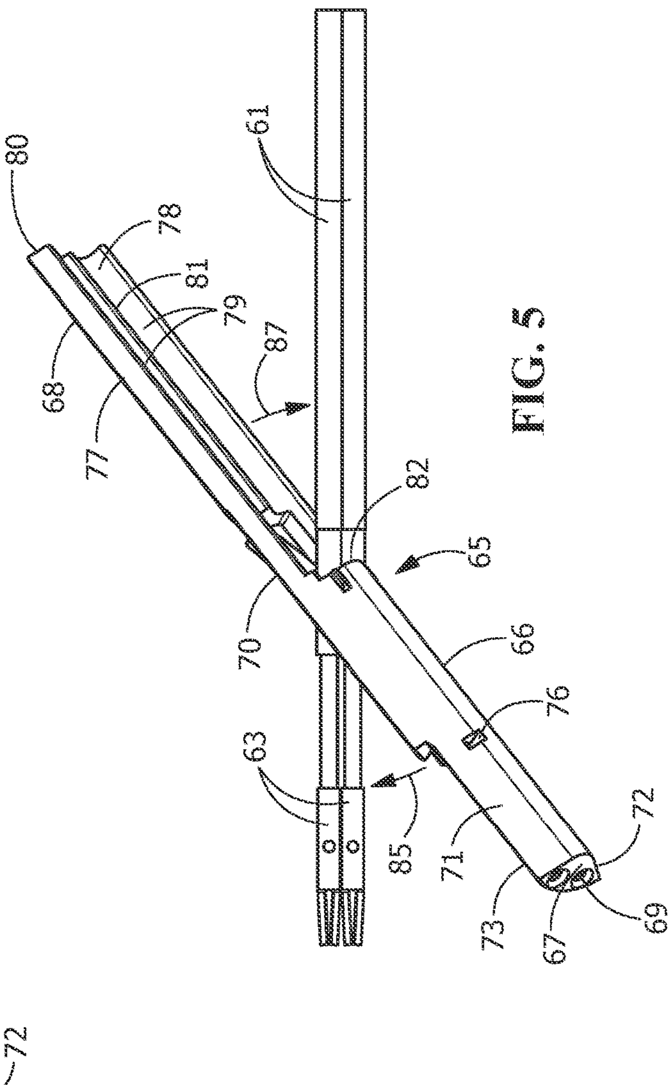
FIG. 5 is a perspective view of contacts and cables being inserted through a contact receiving opening in the illustrative contact insulator of FIG. 1.

With the contacts 63 properly inserted through the contact receiving opening 82, the contact insulator 65 is rotated in the direction of the arrows 85 and 87 shown in FIG. 5. In alternative embodiments, the contacts 63 and signal conductors 61 may be rotate relative to the contact insulator 65.

As the rotation of the occurs, the contacts 63 are moved into the contact receiving slots 74 of the conductor receiving portion 68. Rotation continues until the contacts 63 are fully seated in the contact receiving slots 74, as shown in FIG. 1. In this position, the retention projections 75 in each of the contact receiving slots 74 frictionally engages the contacts 63 to physically retain the contacts 63 in the contact receiving slots 74. As rotation occurs, the signal conductors 61 are also moved into position in in the conductor receiving slots 79 of the conductor receiving portion 68.

In the fully inserted position, the contacts 63 are positioned in the contact receiving slots 74 through the open third side 73 of the contact receiving portion 66. Also in the fully inserted position, the signal conductors 61 are positioned in the conductor receiving slots 79 through the second open side 78 of the conductor receiving slots 79. As the open third side 73 and the second open side 78 open in opposite directions, the positioning of the contacts 63 and the signal conductors 61 in both the contact receiving slots 74 and the conductor receiving slots 79 prevents the contacts 63 and signal conductors 61 from being removed without undergoing a rotating or pivoting motion. This adds to the stability of the positioning of the contacts 63 in the contact receiving slots 74 and the signal conductors 61 in the conductor receiving slots 79.

Figure 6:
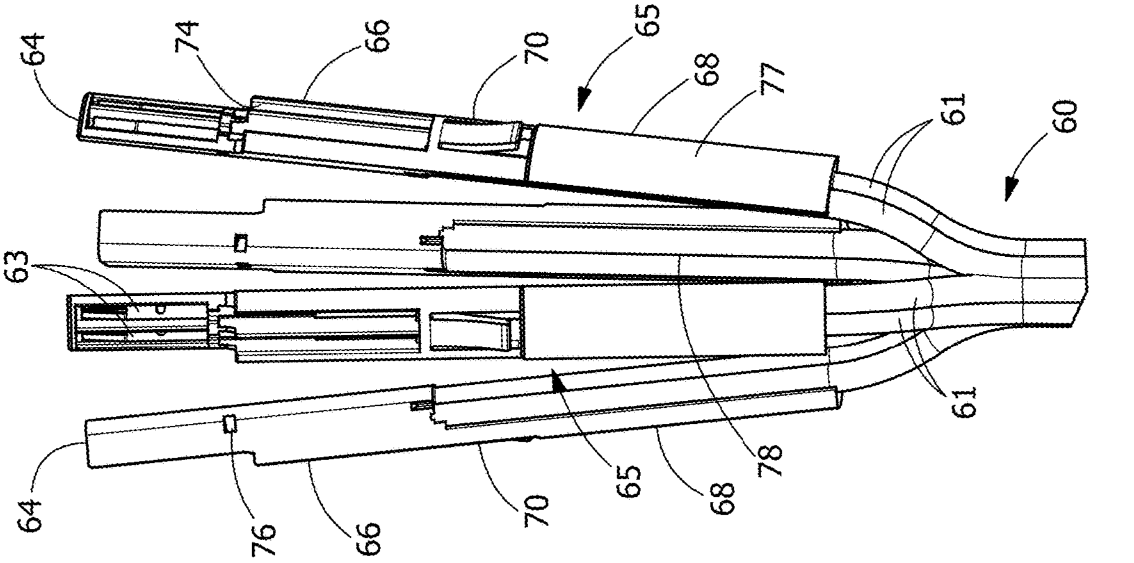
FIG. 6 is a perspective view of four contact insulators attached to four differential pairs of contacts.

In the illustrative embodiment shown, each contact insulator 65 is configured to house two contacts 63. As eight signal contacts 63 are shown (FIG. 6), with four differential pairs of contacts 63, four contact insulators 65 are used to terminate the cable. The same process is used to terminate each of the differential pairs of contacts 63.

For each contact insulator 65, the contacts 63 are inserted through the rear of the contact insulator 65 to provide a way to easily manage the installation steps. The signal conductors 61 are not able to move to the outer edges of the contact insulators 65, making it easier to gather the signal conductors 61 together during installation into the shell.

Once all the contacts 63 are properly inserted into contact insulators 65, the contact insulators 65 are inserted into respective contact receiving cavities 53 defined by the first shield member 40 and the second shield member 42 of the crosstalk shield 14. The retention latches 83 cooperate with the shell housing 12 to retain the contact insulators 65 in the shell housing 12 of the connector assembly 10.

Occasionally, contacts 63 will need to be removed from the contact insulator 65 after they are fully seated. When a contact 63 is to be removed from the contact receiving slot 74, a small diameter tool (not shown) is inserted into the access opening 76. The tool can be used to push the contact 63 past the retention projections 75 in the contact receiving slot 74, thereby releasing the contact 63 from the contact receiving slot 74. As the access opening 76 is located directly in line and behind the retention projections 75 there is no moment applied to the contact 63 by the tool and the contact 63 can be pushed directly past the retention projections 75 with no damage to the contacts 63 or the retention projections 75. In addition, as the contact insulators 65 housing only pairs of contact 63, the contacts 63 can be more selectively repaired without disturbing the other pairs already seated.

The contact insulators 65 of the present invention facilitates the controlled manipulation of the signal conductors 61, as many signal conductors 61, such as, but not limited to, Cat6a conductor are inherently twisted and tend to move wherever they want while assembly occurs. Creating a way to manage the signal conductors 61 with features in the contact insulators 65 decreases assembly time and difficulty. With the signal conductors 61 and contacts 63 on opposite sides of the contact insulator 65, simple relative movements are not able to dislodge the contacts 63.

Securing the contacts 63 into their own contact insulators 65 two-at-a-time allows for the installation of a pair of contacts 63 and repeat the same steps on the remaining pairs. The assembled contact insulators 65 are able to move freely without affecting the other contacts, thereby reducing the complexity and time for assembly.

In addition, the use of the access opening 76 allows for the reorganization of the contacts 63 for correct signal pair orientation without damaging the contacts 63 or the contact insulators 65. This facilitates an easier and more simplified installation process.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A contact insulator for use with high speed cable with differential pairs of contacts, the contact insulator comprising:

a contact receiving portion having a first closed side, a second closed side and a third open side;

a conductor receiving portion having a first closed side, an oppositely facing second open side;

a transition portion positioned between the contact receiving portion and the conductor receiving portion;

two contact receiving slots provided in the contact receiving portion, the contact receiving slots extending from a mating end of the contact insulator to the transition portion;

two conductor receiving slots provided in the conductor receiving portion, the conductor receiving slots extending from a conductor receiving end of the contact insulator to the transition portion;

the second open side and the conductor receiving slots of the conductor receiving portion opening in an opposite direction as the third open side and the contact receiving slots of the contact receiving portion;

the transition portion having a contact receiving opening which extends through the contact insulator from the second open side of the conductor receiving portion to the open third side of the contact receiving portion, the contact receiving opening is dimensioned to allow the contacts to be inserted therethrough;

access openings extending through either the first closed side or the second closed side and extending into the contact receiving slots, the access openings dimensioned to receive a removal tool therein to facilitate the removal of contacts positioned in the contact receiving slots.

2. The contact insulator as recited in claim 1, wherein retention projections extend into each of the contact receiving slots.

3. The contact insulator as recited in claim 2, wherein the access openings are in line with the retention projections.

4. The contact insulator as recited in claim 3, wherein the contact receiving slots are spaced from each other by an insulative wall and extend essentially parallel to each other.

5. The contact insulator as recited in claim 4, wherein the conductor receiving slots are spaced from each other by an insulative wall and extend essentially parallel to each other.

6. The contact insulator as recited in claim 1, wherein the contact receiving portion has a generally triangular configuration.

7. The contact insulator as recited in claim 6, wherein a mating wall extends at the mating end of the contact insulator, the mating wall extends between the first closed side, the second closed side and the third open side.

8. The contact insulator as recited in claim 7, wherein mating contact receiving openings extend through the mating wall.

9. The contact insulator as recited in claim 1, wherein a retention latch is provided on the transition portion.

10. The contact insulator as recited in claim 9, wherein the retention latch extends into the contact receiving opening but does not prevent the insertion of the contact through the contact receiving opening.

11. A contact insulator for use with high speed cable with differential pairs of contacts, the contact insulator comprising:

a contact receiving portion having contact receiving slots for receiving the contacts therein, the contact receiving slots open from a first side of the contact insulator;

a conductor receiving portion having conductor receiving slots for receiving signal conductors of the high speed cable therein, the conductor receiving slots open from a second side of the contact insulator;

a transition portion positioned between the contact receiving portion and the conductor receiving portion, the transition portion having a contact receiving opening which extends through the contact insulator, the contact receiving opening is dimensioned to allow the contacts to be inserted therethrough;

wherein the contact insulator is rotated about the contacts and the signal conductors to position the contacts in the contact receiving slots through the first side of the contact insulator and position the signal conductor in the conductor receiving slots through the second side of the contact insulator;

wherein access openings extend through sides of the contact receiving portion and extend into the contact receiving slots, the access openings are dimensioned to receive a removal tool therein to facilitate the removal of contacts positioned in the contact receiving slots.

12. The contact insulator as recited in claim 11, wherein retention projections extend into each of the contact receiving slots.

13. The contact insulator as recited in claim 12, wherein the access openings are in line with the retention projections.

* * * * *